Dec. 19, 1967  T. GASSINO ETAL  3,358,917
TOTAL TAKING DEVICE FOR A PRINTING CALCULATING OR LIKE MACHINE
Filed March 25, 1966  4 Sheets-Sheet 2
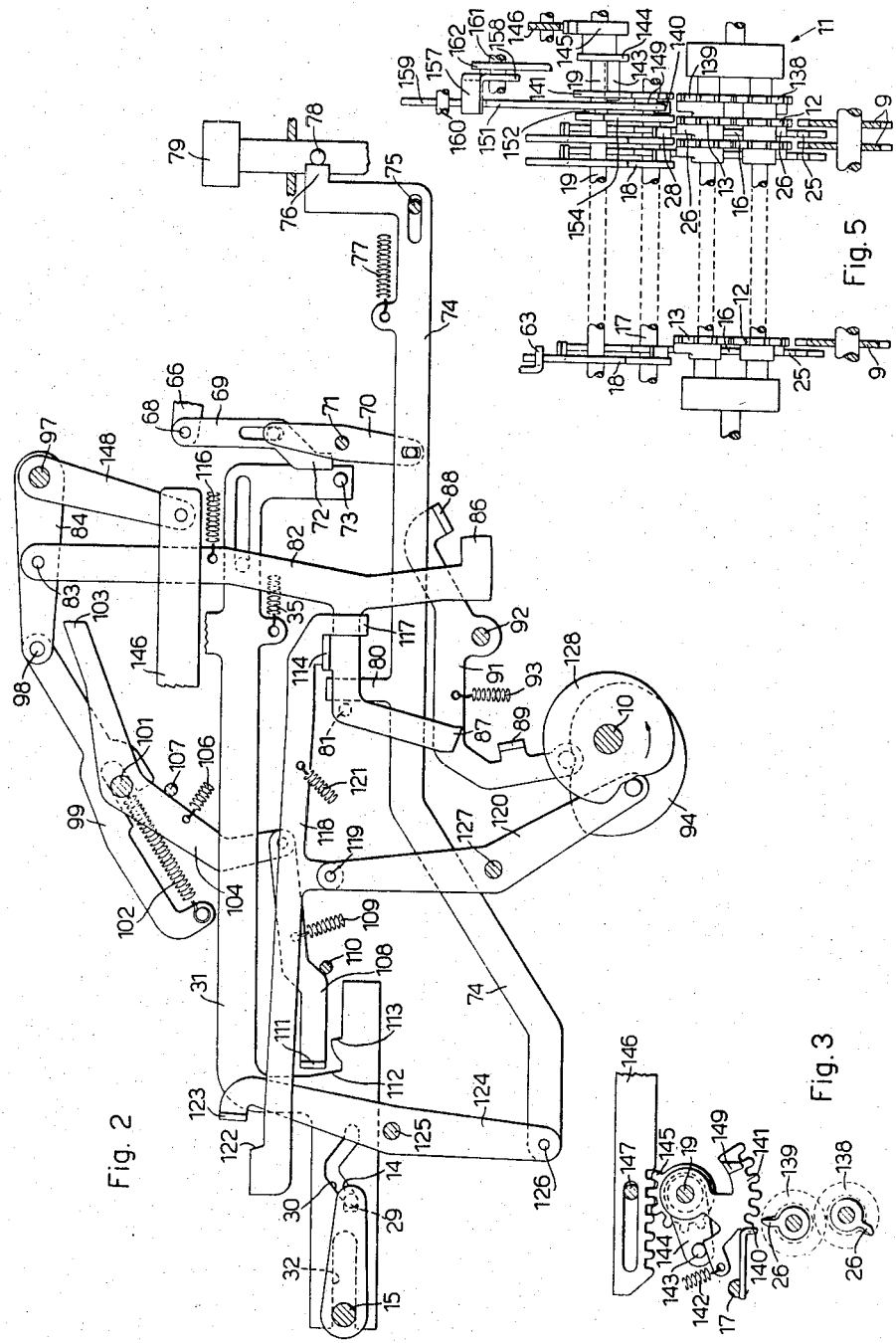
INVENTORS
TERESIO GASSINO
MICHELE BOVIO
BY John Toggenburger
AGENT INVENTORS
TERESIO GASSINO
MICHELE BOVIO
BY John Toggenburger
AGENT Dec. 19, 1967  T. GASSINO ET AL  3,358,917
TOTAL TAKING DEVICE FOR A PRINTING CALCULATING OR LIKE MACHINE
Filed March 25, 1966  4 Sheets-Sheet 4
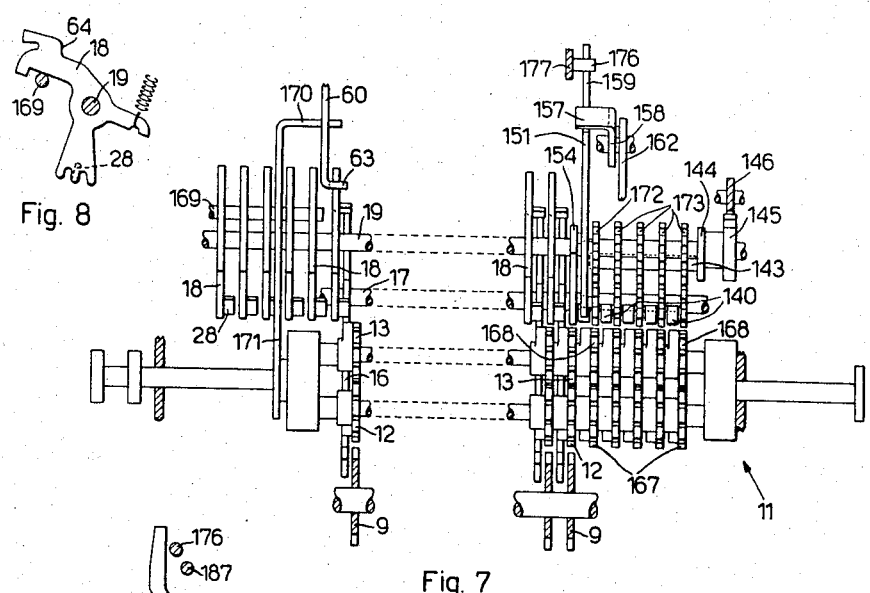
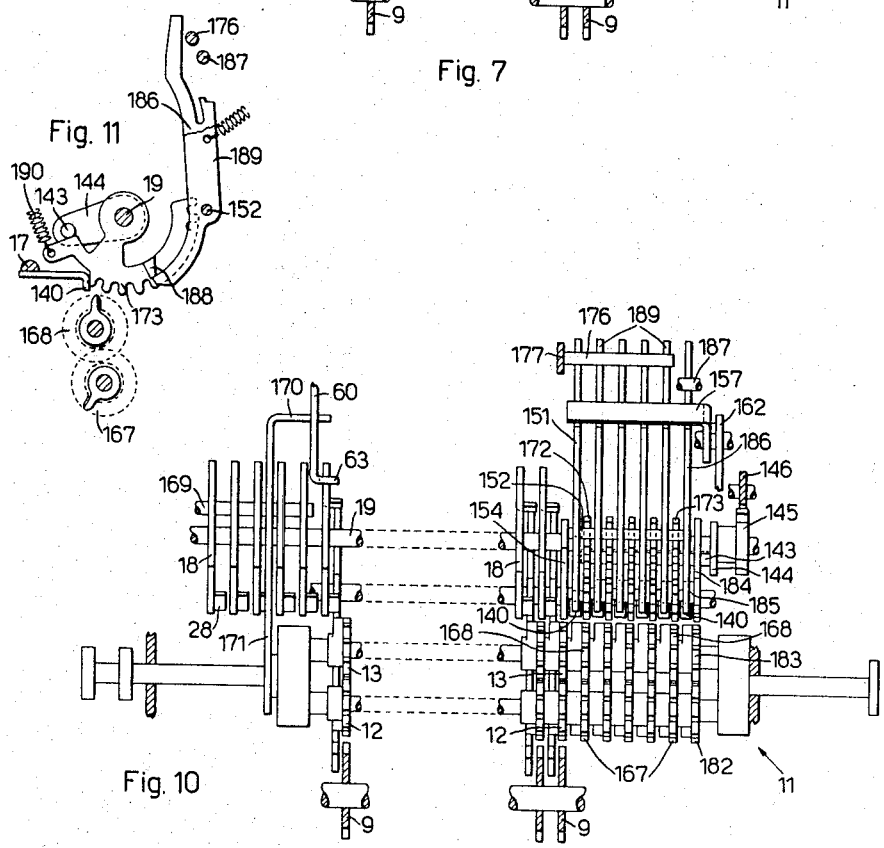
INVENTORS
TERESIO GASSINO
MICHELE BOVIO
BY John Toggenburger
AGENT

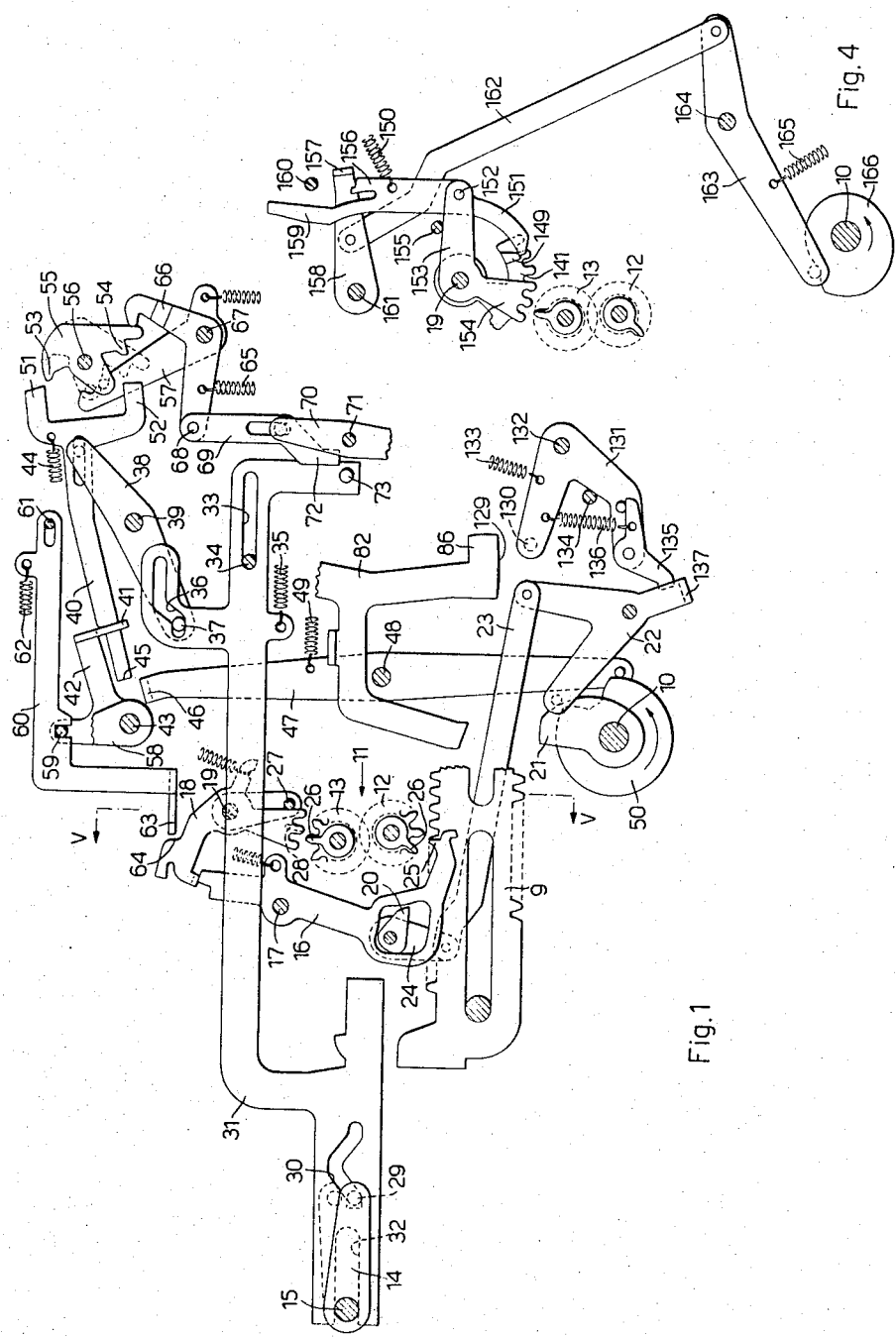

United States Patent Office 3,358,917
Patented Dec. 19, 1967

3,358,917
TOTAL TAKING DEVICE FOR A PRINTING CALCULATING OR LIKE MACHINE
Teresio Gassino, Ivrea, Turin, and Michele Bovio, Banchette, Turin, Italy, assignors to Ing. C. Olivetti & C., S.p.A., Ivrea, Italy, a corporation of Italy
Filed Mar. 25, 1966, Ser. No. 537,489
Claims priority, application Italy, Apr. 5, 1965, 756,570
14 Claims. (Cl. 235—60.31)

ABSTRACT OF THE DISCLOSURE

A printing calculating machine comprises a register having a number of orders exceeding the number of the actuators. The exceeding orders can accumulate a part of amount to be cut off when the total is taken, and are zeroized immediately before taking the total by means separate from said actuators. These means are adapted to round off the lower order of the total and to accumulate the fugitive one in the lowest order of the register just before taking the total.

---

This invention relates to a total taking device for a printing calculating or like machine comprising a set of denominationally arranged actuators adapted to zeroize in a total taking operation the corersponding orders of a register having at least one additional order located at right of said actuators.

The orders at right of the actuators may be used for example for cutting off said orders from a total taken, whereby these orders must be zeroized when the total is taken. Normally the additional orders are zeroized by the actuators after the total taking operation, the register being then transversely displaced for locating the additional orders in front of the actuators. Therefore, the device is intricate and requires for taking a total a very long time both for displacing the register and for zeroizing the additional order. Furthermore, said device is unadapted for zeroizing an order at right of the actuators in a transversely stationary register.

These and other disadvantages are obviated by the total taking device according to the invention, which is characterized by means located at right of said actuators for zeroizing said additional order before said corresponding orders are zeorized by said actuators.

According to another characteristic of the invention said order is zeroized according to the sign of the total taken either to a positive zero position or to a negative zero position, said positive and negative positions being distanced one step, whereby said additional order represents a record of the sign of the last total taken, an element being operable to introduce one unit in the lowest order of said register when the sign of the total to be taken is opposite to that represented by the additional order.

Acnording to a third characteristic of the invention said register comprises a number of additional orders located at right of said actuators, said zeroizing means comprising a number of toothed members located at right of said actuators and each one associated with one of said additional orders, said toothed members being operable for zeroizing said additional orders to cut off the figures contained therein from the total before taking said total, whereby it is possible to round off the lowest order required for the total according to the cut off figures.

These and other characteristics of the invention will become apparent from the following description of two preferred embodiments, and from the accompanying drawings, wherein:

FIG. 1 is a left hand partial longitudinal sectional view of a printing calculating machine incorporating a total taking device according to the invention;

FIG. 2 is another left hand partial longitudinal sectional view of the calculating machine;

FIG. 3 is left hand sectional view of a detail of the total taking device;

FIG. 4 is a sectional view of another detail of the device;

FIG. 5 is a partial frontal sentional view taken according to the line V—V of FIG. 1, according to a first embodiment of the invention;

FIG. 7 is a partial frontal sectional view similar to that of FIG. 5, but according to a second embodiment of the invention;

FIG. 8 is a left hand sectional view of a detail of FIG. 7;

FIG. 10 is a partial frontal sectional view of a modified form of the embodiment of FIG. 7;

FIG. 11 is a left hand sectional view of a detail of FIG. 10.

Figure 6:
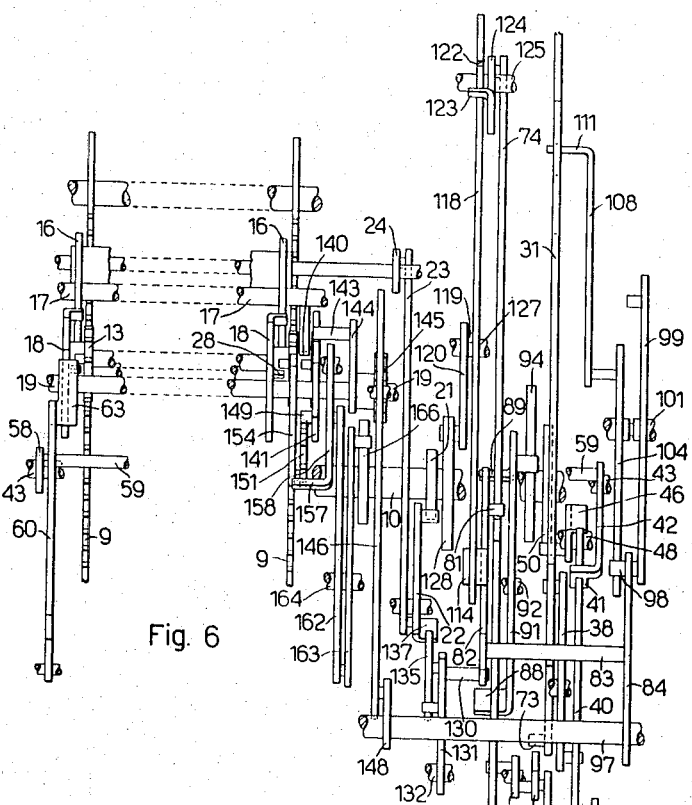
FIG. 6 is a partial plan view of the calculating machine.

The total taking device is incorporated in a calculating machine substantially of the type described in the United States patent application of Teresio Gassino, No. 398,915, now Patent No. 3,379,882. Particularly, the calculating machine comprises a set of fifteen actuators each one formed of a rack 9 (FIG. 1) cyclically reciprocable under the control of a main shaft 10 through an advancing stroke (leftwards in FIG. 1) and a return stroke. The calculating machine is also provided with a register, generically indicated by the numeral 11, of the type having a pair of sets of pinions 12 and 13 for the addition, respectively for the subtraction. The two sets of pinions 12 and 13 are selected for engaging the racks 9, by reversing the register 11 through 180 degrees under the control of a lever 14 fulcrumed on a stationary pivot 15. The lever 14 when located in the position of the FIG. 1, is adapted to predispose the engagement of the addition pinions 12, whereas, when it is rocked to the position shown by broken line in FIG. 1 it is adapted to predispose the engagement of the subtraction pinions 13, in a manner known per se.

Furthermore the register 11 is provided with a ten transfer device substantially of the type described in the United States Patent No. 2,826,366, and it will be here briefly described. For each order of the register 11 a trip lever 16 fulcrumed on a stationary shaft 17 is located at the left of each rack 9 (FIG. 5) and normally latches a corresponding ten transfer member formed of a toothed sector 18 (FIG. 1) fulcrumed on a second stationary shaft 19. Each sector 18 is adapted to be engaged by the next higher order of the register 11. This latter during an accumulating cycle is first lowered to engage the racks 9 during the advancing stroke and then raised to engage the sectors 18 during the return stroke in a manner known per se. The levers 16 are controlled by a universal bar 20, which is cyclically rocked first clockwise and then counterclockwise by a cam 21 of the main shaft 10 through a lever 22, a link 23 and a crank lever 24 secured to the bar 20. Each lever 16 is provided with a projection 25 adapted to be engaged by the conventional transfer tooth 26 of the pinion 12, 13 engaging the corresponding rack 9, upon being rotated one revolution from its zero position. Then the lever 16 is rocked clockwise and releases the sector 18, which is thus rocked counterclockwise into a first angular position to predispose a ten transfer, which will be called primary transfer.

Upon engagement of the register 11 with the sectors 18, a universal bar 27 operated by the main shaft 10 restores the sectors 18 so rocked, thus effecting the primary transfer. If the pair of pinions 12, 13 wherein the transfer has been effected crosses its zero position, the transfer tooth 26 engages a tooth 28 (FIG. 5) projecting rightwards from the sector 18 of the next higher order, whereby this sector 18 is rocked clockwise from its rest position to a second angular position, wherein the sector 18 effects a ten transfer, which will be called secondary transfer, simultaneously with the ten transfer causing same.

The lever 14 is provided with a pin 29 engaging a cam slot 30 of a slide 31 slidable with a notch 32 on the pivot 15 and with a slot 33 on a stationary pin 34. The slide 31 is normally urged by a spring 35 to contact the pin 34 and to predispose the lever 14 for addition. At the depression of a subtraction key not shown in the figure, the slide 31 is displaced rearwards to an intermediate position and locates the lever 14 into the subtraction position shown by a broken line in FIG. 1. The slide 31 is also provided with a cam slot 36 entered by a pin 37 of a lever 38 fulcrumed at 39 and pin and slot connected with a forked member 40. This latter is also guided by a notch of a lug 41 of an arm 42 secured to a shaft 43 rotatably mounted on the machine frame and is normally urged by a spring 44 to contact the lug 41.

The forked member 40 is provided with a projection 45 adapted to be engaged by a lug 46 of a lever 47 fulcrumed at 48 and it is normally urged by a spring 49 to contact a cam 50 of the main shaft 10. The forked member 40 is also provided with two arms 51 and 52 adapted to selectively cooperate with the two corresponding projections 53 and 54 of a sign indicating member formed of a plate 55 secured to a shaft 56 and adapted to be located either in the position shown by continuous lines in FIG. 1 to indicate that a positive total is contained in the register or in the position shown by broken line to indicate that a negative total is contained in the register. The plate 55 is each time locked in the reached position by a spring urged locking member 57 fulcrumed at 67.

A second arm 58 fulcrumed on the shaft 43 is secured to the arm 42 by means of a transverse bar 59 engaging a notch of a slide 60 slidably mounted on a stationary pin 61 and normally urged by a spring 62 to contact same. The slide 60 is provided with a bent lug 63 normally located into the path of a shoulder 64 of the sector 18 of the highest order. Since usually the register 17 has an order more than the set up device, said order may receive only the ten surfaces caused by the preceding order, whereby the sector 18 of the highest order may be rocked clockwise upon engagement of its tooth 28 by the tooth 26 during a secondary transfer. This rotation indicates that a fugitive one has been signalled by the highest order of the register 11.

Assuming that the plate 55 is located in the position of the positive balance as in FIG. 1, near the end of each cycle of the main shaft 10, after the universal bar 27 effected the ten transfer, the cam 50 causes the lever 47 to be rocked clockwise. If the sector 18 of the highest order has not been rocked clockwise, the slide 60 has not been displaced forwards and the lug 46 does not affect the forked member 40. On the contrary, if the highest order of the register 11 effects a secondary transfer, the sector 18 of the highest order is rocked clockwise and its shoulder 64 through the lug 63 displaces the slide 60 forwards. The two arms 42 and 58 through the bar 49 are now rocked clockwise, whereby the lug 41 of the arm 42 lowers the rear projection 45 of the forked member 40. Now the lug 46 engages the projection 45 to displace the forked member 40 forwards.

If the secondary transfer of the highest order is effected during an adding cycle, the slide 31 is located in the position of FIG. 1 and the lever 38 keeps the arm 51 of the forked member 40 above the projection 53 of the plate 55, which thus is not affected by the forked member 40. On the contrary, if the secondary transfer is effected during a subtracting cycle, that is the total becomes negative, the slide 31 has been displaced rearwards. The cam slot 36 has rocked the lever 38 clockwise, thus locating the arm 51 in front of the projection 53 of the plate 55. Now when the lug 46 displaces the forked member 40 forwards, the plate 55 is rocked clockwise to the negative total position shown by broken lines in the FIG. 1.

The plate 55 may be restored to the positive total position only in an adding cycle wherein the sector 18 of the highest order is rotated clockwise. In fact then the slide 60 causes the projection 45 of the forked member 40 to be lowered, while the slide 31 through the lever 38 locates the arm 52 in front of the projection 54 of the plate 55. Then the lug 46 displaces the forked member 40 forwards, whereby the plate 55 is restored to the position of the FIG. 1.

It is to be pointed out that no fugitive one is transmitted to the lowest order upon changing the sign of the balance. It is so prevented that during the calculation several pair of fugitive ones having alternatively opposite sign are transmitted without effect to the lowest order of the register 11.

The calculating machine is provided with a lever 66 fulcrumed at 67 and normally urged by a spring 65 to contact the plate 55. The lever 66 is provided with a pin 68 pivotally mounting a swing lever 69 pin and slot connected with a lever 70 fulcrumed at 71. The lever 69 is also provided with a projection 72 adapted to cooperate within a pin 73 of the slide 31, but normally located above the pin 73. The lever 70 is pin and slot connected with a slide 74 (FIG. 2) slidably mounted on a stationary pin 75 and provided with a projection 76 normally urged by a spring 77 to contact a pin 78 of the stem of a total key 79.

The slide 74 is also provided with a projection 80 adapted to cooperate with a pin 81 of a forked lever 82 linked at 83 with a lever 84. The lever 82 is provided with two shoulders 86 and 87 adapted to alternately cooperate with two lugs 88 and 89 of a lever 91 fulcrumed on a stationary shaft 92 and normally urged by a spring 93 to contact a cam 94 of the main shaft 10. In turn the lever 84 is secured to a shaft 97 rotatably mounted on the machine frame and is linked through a pin 98 with a link 99 slidably mounted on a stationary pin 101 and connected thereto by a spring 102. The pin 98 is adapted to cooperate with a projection 103 of a lever 104 fulcrumed on the pivot 101 and normally urged by a spring 106 to contact a stationary stop 107. Fulcrumed on the lever 104 is a pawl 108 normally urged by a spring 109 to contact a stationary stop 110. The pawl 108 is provided with a bent lug 111 adapted to cooperate with two shoulders 112 and 113 of the slide 31.

The lever 82 is also provided with a bent lug 114 normally urged by a spring 116 to contact a projection 117 of a lever 118 fulcrumed at 119 on a lever 120 and normally urged by a spring 121 to contact the upper surface of the lug 114, the spring 121 prevailing over the spring 116. The lever 118 is also provided with a shoulder 122 adapted to be engaged by a lug 123 of a lever 124 fulcrumed on a stationary pivot 125 and linked at 126 with the slide 74, the shoulder 122 being normally out of the path of the lug 123. The lever 120 is fulcrumed on a stationary pin 127 and is urged by the same spring 121 to contact a cam 128 of the main shaft 10.

Finally, the forked lever 82 is provided with a shoulder 129 (FIG. 1) adapted to cooperate with a pin 130 of a lever 131 fulcrumed at 132 and normally urged by a spring 133 to contact a stationary stop 134. Fulcrumed on the lever 131 is a pawl 135 also connected thereto by a spring 136. The pawl 135 is adapted to cooperate with a lug 137 of the lever 22, but is normally out of the path of the lug 137.

According to a first embodiment of the invention the register 11 is provided with at least one additional order at right of the actuators 9. More particularly the register 11 is provided with an additional pair of intermeshing pinions 138 and 139 for the addition and the subtraction respectively, the pinions 138 and 139 being located at the right of the rack 9 (FIG. 5) of the lowest order and being similar to the pinions 12 and 13. Since the pair of pinions 138, 139, as well as the pairs of the pinions 12, 13 are intermeshed according to the nine complement, when a positive total is to be taken, the transfer tooth 26 of the pinion 138 (FIG. 3) is arrested by a stationary stop 140 in a position, which will be called positive zero position, while when a negative total is to be taken the tooth 26 of the pinion 139 is arrested by the stationary stop 140 in a negative zero position, the positive zero position and the negative zero position being distanced one step. Located on the plan of the pinions 138 and 139 is a zeroizing toothed member or sector 141 fulcrumed on the shaft 19 and normally urged by a spring 142 to contact a pin 143 of an arm 144 rotatably mounted on the shaft 19. Integral with the arm 144 is a toothed sector 145 engaging a rack 146 slidably mounted on a stationary pin 147 and linked with another lever 148 (FIG. 2) secured to the shaft 97.

The sector 141 (FIG. 4) is provided with a cam or tooth 149 contacted by a sensing member or lever 151 urged clockwise by a spring 150. The lever 151 is fulcrumed on a pivot 152 carried by an arm 153 of a toothed element or sector 154 fulcrumed on the shaft 19 and located on the plan of the pinions 12 and 13 (FIG. 5) of the lowest order. Furthermore the spring 150 normally urges the arm 153 to contact a stationary stop 155. The lever 151 is provided with a projection 156 (FIG. 4) adapted to be engaged by a lug 157 of a lever 158, but it is normally located out of the path of the lug 157. Furthermore the lever 151 is provided with a projection 159 adapted to cooperate with a stationary pin 160. The lever 158 is fulcrumed on a stationary pivot 161 and is connected by means of a link 162 to a lever 163 fulcrumed at 164 and normally urged by a spring 165 to contact a cam 166 of the main shaft 10.

The total taking device operates as follows:

At the depression of the total key 79 (FIG. 2) the pin 78 releases the projection 76 of the slide 74, which is now displaced forwards by the spring 77. The slide 74 on one hand rocks the lever 124 counterclockdise, thus locating the lug 123 above the shoulder 122, on the other hand it rocks the lever 70 counterclockwise. If a positive total is contained in the register 11, the lever 66 is located in the position of FIG. 1 and holds the projection 72 of the lever 69 above the pin 73. The lever 69 then does not affect the slide 31, which remains in the addition position. On the contrary, if a negative total is contained in the register 11, the plate 55 causes the lever 66 to be rocked counterclockwise, whereby the projection 72 of the lever 69 (FIG. 2) is located in front of the pin 73. Since the spring 77 prevails over the spring 35, the lever 70 through the lever 69 and the pin 73 displaces the slide 31 rearwards to the subtraction position.

Furthermore, at the depression of the total key 79 the conventional clutch is engaged and the main shaft 10 is started for a first cycle in a manner known per se. At the beginning of the cycle of the main shaft 10, the register 11 (FIG. 1) is now located according to the position taken by the lever 14, that is in the addition position if the total is positive, in the subtraction position if the total is negative. During the first cycle the register 11 does not engage the racks 9, which are held at rest in a known manner. On the contrary, the register pinions 12 or 13 engages the transfer sectors 18 and the sector 154 (FIG. 4), while one of the two additional pinions 138 and 139 (FIG. 5) engage the sector 141.

Simultaneously the cam 128 (FIG. 2) rocks the lever 120 clockwise and displaces the lever 118 forwards. The projection 117 of the lever 118 now causes the spring 166 to rock the forked lever 82 to locate its shoulder 86 into the path of the lug 88 of the lever 91. Thereafter, the cam 94 rocks the lever 91 clockwise, whereby its lug 88 engages the shoulder 86 of the lever 82. This latter is thus displaced downwards, while the spring 121 causes the lever 118 to contact the lug 123. Furthermore, the lever 82 rocks the lever 84 counterclockwise together with the shaft 97 and the lever 148. The lever 84 rocks now the link 99 counterclockwise and when the link 99 reaches the position, wherein the lever 84 and the link 99 are mutually aligned, the spring 102 additionally rocks the link 99 counterclockwise thus fully displacing the forked lever 82 downwards.

In turn the lever 148 displaces the rack 146 (FIG. 3) forwards thus rocking the sector 145 clockwise. The sector 145 through the arm 144 releases the sector 141 from its pin 143. The spring 142 rotates now the sector 141, which in turn rotates the pinions 138, 139 until the transfer tooth 26 is arrested by the stationary stop 140.

If no change of the sign occurred in the total after the next preceding total taken, the pinion 138 or 139 engaging the sector 141 already abuts the stop 140, whereby the sector 141 is not rotated and its tooth 149 does not release the lever 151 (FIG. 4). Thereafter, the cam 166 through the lever 163 and the link 162 rocks the lever 158 clockwise, but the lever 151 is not affected by the lug 157.

On the contrary, if the sign of the total is changed with respect to the next preceding total taken, the sector 141 is engaged by the other pinion 139 or 138 (FIG. 3), instead of that previously arrested by the stationary stop 140. Since the pinions 138 and 139 are meshed according to the complement to nine, the pinion now engaging the sector 141 is rotated one step clockwise with respect to the stop 140. Therefore, this pinion is now rotated one step counterclockwise by the sector 141 till it is arrested by the stop 140. Then the tooth 149 of the sector 141 releases the lever 151 (FIG. 4), which is now rocked clockwise by the spring 150 and locates its projection 156 into the path of the lug 157. When the cam 166 rocks the lever 158 clockwise, the lug 157 displaces now the lever 151 downwards, thus rocking the sector 154 one step clockwise. The sector 154 rotates the pinions 12 and 13 of the lowest order, thus introducing at the instant of taking the total the fugitive one for obtaining the true total. Then the register 11 (FIG. 5) is disengaged from the sectors 18, 141 and 154.

When the lever 84 (FIG. 2) is rocked counterclockwise, its pin 98 during the last portion of its stroke engages the projection 103, thus rocking the lever 104 clockwise. The pawl 108 is now displaced rearwards and, if the slide 31 was predisposed in the addition position as in FIG. 2, the lug 111 engages the shoulder 112 to displace the slide 31 to the intermediate position, whereby the lever 14 is rocked to the subtraction position. On the contrary, if the slide 31 was predisposed in the intermediate or subtraction position, the lug 111 engages the shoulder 113 to additionally displace the slide 31 rearwards to its extreme position, whereby the cam slot 30 causes the lever 14 to be returned to the addition position.

In turn when the forked lever 82 is lowered its edge 129 (FIG. 1) engages the pin 130 of the lever 131, which is thus rocked clockwise. In turn the lever 131 locates the pawl 135 into the path of the lug 137 of the lever 22, thus locking this latter in the extreme clockwise position reached at the end of each machine cycle. Then the lever 22 through the link 23, the crank lever 24 and the bar 20 locks the latches 16 in such a position as to predispose the projections 25 for arresting the transfer teeth 26 of the register pinions 12, 13 in their zero position.

Near the end of the cycle, the cam 94 (FIG. 2) causes the lever 91 to be restored by the spring 93, while the lever 82 remains in the lower position. Thereafter the cam 128 causes the spring 121 to return the lever 120 counterclockwise and to latch the shoulder 122 by means of the lug 123 of the lever 124, while the projection 117 engages the lug 114 and restores the lever 82 so as to bring the shoulder 87 into the path of the lug 89 of the lever 91. Finally, the cam 166 (FIG. 4) restores the lever 158 counterclockwise, thus causing the spring 150 to restore the lever 151 and the sector 154.

At the end of this first cycle, since the slide 74 (FIG. 2) is still displaced forwards, its projection 76 still holds the key 79 lowered. The clutch of the main shaft 10 remains therefore engaged, whereby the shaft 10 effects a second cycle, which is the proper total taking cycle. Since the pawl 108 during the previous cycle displaced in any case the slide 31 one step rearwards and the lever 14 changes accordingly its position, at the beginning of this second cycle the register 11 is reversed. Therefore, if the total to be taken is positive the subtraction pinions 13 are predisposed for engaging the racks 9 (FIG. 1), while if said total is negative the addition pinions 12 are predisposed. Thereafter the register 11 engages the racks 9, whereby the total is taken from the register 11 and is printed on the paper in a known manner.

Furthermore, at the beginning of this second cycle the cam 128 through the lever 120 (FIG. 2) displaces again the lever 118 forwards. The shoulder 122 of the lever 118 rocks the lever 124 clockwise, thus returning the slide 74 rearwards. The key 79 is thus released by the projection 76 and is restored by a spring not shown in the drawings, whereby at the end of the cycle, the machine will be stopped. Furthermore, the slide 74 through its projection 80 and the pin 81 prevents the lever 82 from following the projection 117 of the lever 118.

Thereafter the cam 94 rocks the lever 91 clockwise, and the lug 89 engages the shoulder 87 thus restoring the lever 82 upwards. Now the lever 84 causes the pawl 108 to be restored by the spring 106, while the lever 148 restores the rack 146 (FIG. 3) and therefore the pinion 145, the pin 143 and the sector 141. The tooth 149 of the sector 141 engages again the lever 151 (FIG. 4) thus bringing the projection 156 again out of the path of the lug 157. At the end of the cycle the cam 128 (FIG. 2) causes the lever 120 to be restored simultaneously with the swing lever 118, whereby the projection 117 engages again the lug 114.

It is thus clear that the means 146, 141 are located at right of the actuators 9, and are adapted to zeroize the additional pinions 138, 139 of the register 11 before the pinions 12, 13 are zeroized by the actuators 9.

According to a second embodiment of the invention, the register 11 is provided with twenty pairs of pinions, fifteen pairs 12, 13 normally cooperating with the actuators 9 and five additional pairs 167, 168 (FIG. 7) normally located at right of the racks 9. The register 11 may be transversely displaced so as to set a number of said pairs of pinions 167, 168 variable from zero to five in correspondence with the racks 9. Since for an accumulating cycle the register 11 may have been displaced leftwards, each pair of pinions 167, 168 is provided with a transfer sector 18. However, the five sectors 18 from left are not associated with any rack 9, or lever 16, whereby these sectors 18 may effect only secondary ten transfer, and are normally spring urged to contact a stationary stop pin 169 (FIG. 8), instead of the trip levers 16. Now the slide 60 cooperates with a lug 170 (FIG. 7) of a plate 171 transversely movable with the register 11, the slide 60 being transversely movable therewith, whereby the lug 63 is always located into the path of the shoulder 64 of the sector 18 each time associated with the pinions 12 and 13 of the highest order.

Lying on the plan of the rack 9 of the lowest order is the above described sector 154 (FIG. 9) and the lever 151. Located at right of the sector 154 are five stops 140 each one adapted to arrest the transfer tooth 26 of the additional pinions 167, 168. Furthermore, located at right of the sector 154 is a sector 172 associated with the highest order pinions 167, 168, that is the first pair beginning from the left, four sectors 173 (FIG. 11) associated with the other four pairs of pinions 167, 168 being located at right of the sector 172.

The sectors 172 and 173 (FIGS. 9 and 11) are fulcrumed on the shaft 19 and are normally urged by a spring 190 to contact the pin 143 of the arm 144. Each sector 172, 173 is provided with nine teeth for zeroizing the corresponding pinions 167 and 168 from any angular position thereof. The sector 172 (FIG. 9) is also provided with a tooth 174 and with a projection 175, the length of which corresponds to four steps of the sector 172. The tooth 174 and the projection 175 is adapted to cooperate with the lever 151. The projection 159 of the lever 151 is adapted to cooperate with a manipulative member comprising a pin 176 secured to a slide 177 slidably mounted on a stationary pin 178 and urged by a spring 179 to cooperate with a stationary pin 180. The slide 177 is manually settable from the rest position shown in FIG. 9 to each one of a pair of effective positions I and II, as it will be specifically described hereinafter.

The register 11 is restored each time to the transverse position of FIG. 7 before a total is taken. Assuming that the slide 177 is located in the rest position shown in FIG. 9, upon depressing the total key 79 (FIG. 2) during the first total cycle of the shaft 10, when the rack 146 is displaced forwards, the pin 143 (FIG. 9) releases the sectors 172 and 173. These latter are now rocked clockwise by their spring 190 till the pinions 167, 168 are arrested by the stationary stops 140. Since the projection 159 of the lever 151 is immediately arrested by the pin 176, the lever 151 is substantially unaffected by the displacement of the tooth 174, even if the sector 172 has been rocked clockwise. The lug 157 of the lever 158 does not engage the projection 156 of the lever 151, whereby the figures contained in the orders one to five from the right of the register 11 are cut off, while the figure contained in the register order associated with the rack 9 of the lowest order is not rounded off.

Assuming now that the slide 177 has been displaced to the position I, upon depressing the total key 79 the pin 143 releases the sectors 172 and 173 to zeroize the pinions 167, 168 as in the above case. If the pinion 167 or 168 of the highest order to be cut off is in the zero position, the sector 172 is not rocked clockwise, whereby its tooth 174 does not release the lever 151 and the sector 154 does not affect the corresponding pinions 12 or 13 of the lowest order. On the contrary, if the pinions 167, 168 of the highest order to be cut off are located in a position other than zero, the sector 172 may rotate by a number of steps from one to nine to zeroize the corresponding pinions. Now the tooth 174 releases the lever 151, which is rocked till contacting the pin 176 and brings its projection 156 into the path of the lug 157. Now the lug 157 pushes the lever 151 downwards, thus rotating the sector 154 clockwise, whereby one unit is added into the pinion 12 or 13 of the lowest order, thus rounding off said order to the next higher figure according to the highest cut off order.

Finally, assuming that the slide 77 has been displaced to the position II, upon depressing the total key 79 in the case the highest order to be cut off is a zero, the pinions 12, 13 of the lowest order remain unaffected as in the above case. On the contrary, in the case the highest order to be cut off is different than zero, if the pinion 167 or 168 is located in a position from five to nine, when zeroized it causes the sector 172 to be rotated a number of steps from one to five. Then the tooth 174 releases the lever 151, which contacts the projection 175 thus locating the projection 156 into the path of the lug 157, whereby the figures of the lowest required order are increased one unit. If the pinion 167 or 168 of the highest order to be cut off is located in a position from one to four, when zeroized it causes the sector 172 to rotate a number of steps from six to nine, whereby even the projection 175 of the sector 172 releases the lever 151. This latter is now rocked more than in the preceding case and instead of the projection 156 locates a notch 181 into the path of the lug 157, whereby now the sector 154 remains unaffected by the lug 157. Therefore, it is clear that when the slide 177 is predisposed in the position II the lowest order required for the total is rounded off according to the average value of the highest cut off order, that is if the highest figure to be cut off is higher or equal to five the lowest required order is rounded off to the next higher figure, on the contrary if the highest figure to be cut off is lower than five the lowest required order is rounded off by merely cutting off the lower orders.

From the above description it appears that the lowest order required for the total is rounded according to the figure of the highest order to be cut off, without reference to the figures of the other rightward orders. This is always correct in the case the amount is to be rounded off according to the average value, since an order followed by the value 49999 must not be rounded, while an order followed by the value 50000 must be rounded off to the next higher figure. In the case the value is to be rounded off always to the next higher figure, if only the value of the highest order to be cut off is taken into account, the value 09999 will be erroneously cut off.

Furthermore, it is to be pointed out that, in the case the sign of the total has been changed, if the highest order to be cut off has received no figure during the calculation the corresponding pinion 167, 168 is located in the position nine, whereby the sector 172 causes the introduction of the fugitive one into the units order. But in the case the highest order to be cut off has received only one unit during the calculation, the corresponding pinion 167, 168 passes from nine to zero and the sector 172 is unable to cause either the introduction of the fugitive one, or the rounding off operation.

In the practice it may be accepted that the amount be rounded off to the next higher figure only if the highest cut off figure is higher than one and that the fugitive one due to a change of the sign be neglected, assuming just that the fugitive one is always comprised in the cut off figures. However in specific cases it is required that an order followed by the amount of 00001 be rounded off to the next higher figure and that the fugitive one be taken into account. To this end, according to a modified form of the embodiment of FIGS. 7, 8 and 9, the register 11 is provided with a further pair of pinions 182, 183 (FIG. 10) at right of the pinions 167, 168, the pinions 182, 183 having the function of the pinions 138, 139 of FIG. 5. Therefore, the pinions 182, 183 (FIG. 10) will never engage any rack 9, whereby their position always indicate the sign of the last total taken.

The pinions 182 and 183 are adapted to cooperate with a corresponding sector 184 similar to the sector 141 (FIG. 5) and adapted to control through a tooth 185 a corresponding lever 186 similar to the lever 151 and fulcrumed on the same pivot 152 of the sector 154. The lever 186 is not affected by the pin 176 of the slide 177, but it may cooperate with a stationary pin 187 (FIG. 11). Each sector 173 is also provided with a tooth 188 (FIG. 11) similar to the tooth 149 and contacted by a corresponding lever 189. However, the sectors 173 are deprived of the projection 175, which is provided only on the sector 172 (FIG. 9).

Figure 9:
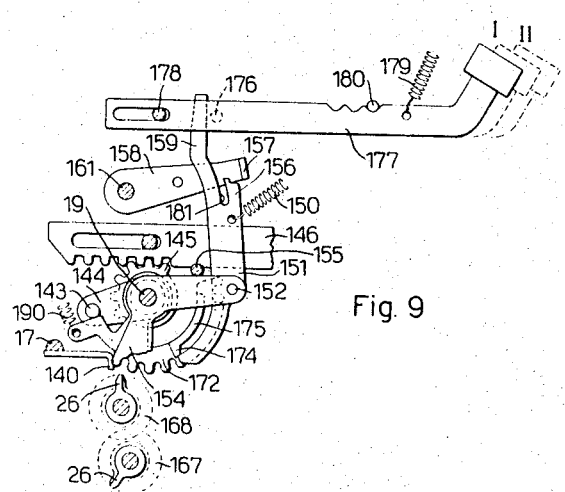
FIG. 9 is a left hand sectional view of another detail of the embodiment of FIG. 7.

If the slide 177 is located in the rest position as shown in FIG. 9, the sectors 172 and 173 never affect the sector 154, as in the preceding case. On the contrary, the sector 184 (FIG. 10) through the corresponding lever 186 causes the sector 154 (FIG. 9) to be rotated one step each time the sign of the total has been changed thus introducing the fugitive one into its lowest required order.

On the contrary, if the slide 177 (FIG. 9) is displaced to the position I for rounding off the lowest order of an amount to the next higher figure, if at least one of the sectors 172, 173 (FIG. 10) is rotated one step and predisposes the corresponding lever 151 or 189 into the path of the lug 157, the sector 154 is rotated one step. The lowest required order is now increased one unit both when the total sign has been changed, and when at least one of the orders to be cut off is different than zero.

Finally if the slide 177 (FIG. 9) is displaced to the position II, the sector 184 causes tre sector 154 to be rotated one step when the total sign has been changed, the sector 172 (FIG. 10) causes the sector 154 to be rotated when the corresponding order is higher or equal to five, whereas the sectors 173 (FIG. 11), deprived of the projection 175 (FIG. 9) are unable to cause the rotation of the sector 154, whereby the lowest required order is rounded off according to the average value of the cut off orders.

It is intended that many changes, improvements and additions of parts may be made to the described device without departing from the scope of the invention as defined from the appended claims.

What we claim is:

1. In a printing calculating or like machine having a set of denominationally arranged reciprocable actuators differentially movable according to an amount to be accumulated, and a register adapted to be engaged with said actuators when so reciprocated to accumulate said amount, a total taking device comprising in combination:
    (a) means for causing said actuators to be reciprocated under control of said register to zeroize the corresponding orders thereof,
    (b) at least one additional order on said register located at right of said actuators,
    (c) and at least a toothed member located at right of said actuators and automatically reciprocable immediately before said corresponding orders are zeroized by said actuators for zeroizing said additional order.

2. In a printing calculating or like machine having a set of denominationally arranged actuators, and a register provided with a pair of intermeshing sets of pinions adapted to cooperate with said actuators, said register being adapted to be reversed either to an adding condition to a subtracting condition, a total taking device comprising in combination:
    (a) means for causing said actuators to zeroize the corresponding orders of said register by engaging one of said sets of pinions,
    (b) at least one additional order on said register provided with a pair of additional intermeshing pinions located at right of said actuators,
    (c) a toothed member located at right of said actuators and at the opposite side of said actuators with respect to said register, said toothed member being adapted to engage one of said additional pinions for zeroizing same before said actuators engage said set of pinions,
    (d) and means for causing said register to be reversed after engagement of said toothed member and before engagement of said actuators.

3. A total taking device according to claim 2, wherein said conditioning means comprise:
    (e) an add-subtract control member adapted to be moved step by step through each one of three subsequent positions, said register being caused by said add-subtract control member when located in the central position of said three positions to assume a first one of said two conditions and when located in each extreme position of said three positions to assume the other one of said two conditions,
    (f) and a pawl for advancing said add-subtract control member one step after said additional pinions are zeroized.

4. In a printing calculating or like machine having a set of denominationally arranged actuators, and a register provided with a pair of intermeshing sets of pinions adapted to cooperate with said actuators, said register being adapted to be reversed either to an adding condition or to a subtracting condition, a total taking device comprising in combination:
  (a) means for causing said actuators to zeroize the corresponding orders of said register by engaging one of said sets of pinions,
  (b) at least one additional order on said register provided with a pair of additional intermeshing pinions located at right of said actuators,
  (c) a toothed member located at right of said actuators and at the opposite side of said actuators with respect to said register, said toothed member being adapted to engage one of said additional pinions for zeroizing same before said actuators engage said set of pinions,
  (d) an add-subtract control member adapted to be moved step by step through each one of three subsequent positions, said register being caused by said add-subtract control member when located in the central position of said three positions to assume a first one of said two conditions and when located in each extreme position of said three positions to assume the other one of said two conditions,
  (e) a ten transfer member associated with each pair of said set of pinions, the transfer member of the highest order being operable for signaling that a fugitive one occurs,
  (f) a sign indicating member positionable under the control of said add-subtract control member and said highest order transfer member for indicating the sign of the total contained in said register,
  (g) a total taking control member,
  (h) means operable by said total taking control member for predisposing said add-subtract control member according to the position of said indicating member.
  (i) and a pawl for advancing said add-subtract control member one step after said additional pinions are zeroized.

5. In a printing calculating or like machine having a set of denominationally arranged actuators, and a register provided with a pair of intermeshing sets of pinions adapted to cooperate with said actuators set, said register being adapted to be reversed either to an adding condition or to a subtracting condition, a total taking device comprising in combination:
  (a) means for causing said actuators to zeroize the corresponding orders of said register by engaging one of said sets of pinions,
  (b) at least one additional order on said register provided with a pair of additional intermeshing pinions located at right of said actuators,
  (c) a toothed member located at right of said actuators and at the opposite side of said actuators with respect to said register,
  (d) a total taking control member,
  (e) an add-subtract control member operable by said total taking control member for causing said register to assume a condition according to the sign of the total contained therein,
  (f) means for alternately engaging said register with said toothed member and with said actuators,
  (g) means for causing said toothed member to zeroize said additional pair of pinions before said actuators are engaged with said set of pinions, said additional pair of pinons being so zeroized to a positive zero position or to a negative zero position according to said sign, said two positions being distanced one step,
  (h) and means cooperating with said add-subtract control member for causing said register to be reversed after engagement of said toothed member and before engagement of said actuators.

6. A total taking device according to claim 5, comprising:
  (i) an element operable by said toothed member upon being displaced to zeroize said additional pair of pinions in order to introduce one unit in the lowest order pinions of said set, whereby said unit is introduced when the sign of the total to be taken is opposite to that represented by said additional pinions.

7. A total taking device according to claim 5, comprising:
  (j) a sensing member connected to said element for sensing said toothed member,
  (k) and a cyclically operable member for engaging said sensing member, only when said toothed member has been so displaced.

8. In a printing calculating or like machine having a set of denominationally arranged actuators, and a register provided with a pair of intermeshing sets of pinions adapted to cooperate with said actuators, said register being adapted to be reversed either to an adding condition or to a subtracting condition, a total taking device comprising in combination:
  (a) means for causing said actuators to zeroize the corresponding orders of said register by engaging one of said sets of pinions,
  (b) a number of additional orders on said register located at right of said actuators, each additional order being provided with a pair of additional intermeshing pinions, said register being transversely movable during accumulating operations for causing said additional pinions to cooperate with said actuators,
  (c) a number of toothed members located at right of said actuators and at the opposite side of said actuators with respect to said register,
  (d) a total taking control member,
  (e) an add-subtract control member operable by said total taking control member for causing said register to assume a condition according to the sign of the total contained therein,
  (f) means for alternately engaging said register with said toothed members and with said actuators,
  (g) means for causing said toothed members to zeroize said additional pairs of pinions before said actuators are engaged with said set of pinions to cut off the figures contained therein,
  (h) and means cooperating with said add-subtract control member for causing said register to be reversed after engagement of said toothed members and before engagement of said actuators.

9. In a printing calculating or like machine having a set of denominationally arranged actuators, and a register provided with a pair of intermeshing sets of pinions adapted to cooperate with said actuators, said register being adapted to be reversed either to an adding condition or to a subtracting condition, a total taking device comprising in combination:
  (a) means for causing said actuators to zeroize the corresponding orders of said register by engaging one of said sets of pinions,
  (b) a number of additional orders on said register located at right of said actuators, each additional order being provided with a pair of additional intermeshing pinions,
  (c) a number of toothed members located at right of said actuators,
  (d) means transversely movably mounting said register so as to cause said additional orders to cooperate with said actuators during an accumulating operation, said register being transversely restored before a total is taken,
  (e) a total taking control member,
  (f) an add-subtract control member operable by said total taking control member for causing said register to assume a condition according to the sign of the balance contained therein, (g) means for alternately engaging said register with said toothed member and with said actuators, (h) means for causing said toothed members to zeroize said additional pairs of pinions before said actuators are engaged with said set of pinions to cut off the figures contained therein, (i) an element operable for introducing one unit in the lowest order pinions of said set, (j) a cam integral with the highest order toothed member of said number, (k) a sensing member connected to said element for sensing said cam, (l) and a cylically operable member for engaging said sensing member upon a displacement of said cam less than a predetermined amount for rounding off the lowest order required for the total according to the figure of highest cut off order.

10. A total taking device according to claim 9, comprising:

(n) a manipulative member settable for replacing said cam controlling said sensing member when said cam is displaced not less said predetermined amount whereby said lowest required order is rounded off to the next higher figure according to the figure of the highest cut off order.

11. In a printing calculating or like machine having a set of denominationally arranged actuators, and a register provided with a pair of intermeshing sets of pinions adapted to cooperate with said actuators, said register being adapted to be reversed either to an adding condition or to a subtracting condition, a total taking device comprising in combination:

(a) means for causing said actuators to zeroize the corresponding orders of said register by engaging one of said sets of pinions, (b) a number of additional orders on said register located at right of said actuators, each additional order being provided with a pair of additional intermeshing pinions, (c) a number of toothed members located at right of said actuators, (d) means transversely movably mounting said register so as to cause said additional orders to cooperate with said actuators during an accumulating operation, said register being transversely restored before a total is taken, (e) a total taking control member, (f) an add-subtract control member operable by said total taking control member for causing said register to assume a condition according to the sign of the balance contained therein, (g) means for alternately engaging said register with said toothed member and with said actuators, (h) means for causing said toothed members to zeroize said additional pairs of pinions before said actuators are engaged with said set of pinions to cut off the figures contained therein, (i) an element operable for introducing one unit in the lowest order pinions of said set, (j) a number of cams each one integral with one of said toothed members, (k) a number of sensing members connected to said element for individually sensing said cams, (l) and a cyclically operable means for engaging one of said sensing members upon a displacement of said cam for rounding off the lowest order required for the total according to all said cut off orders.

12. A total taking device according to claim 11, comprising:

(n) a manipulative member settable in a first effective position for replacing said cams in controlling said sensing members when said cams are displaced not less than a predetermined amount whereby said lowest required order is rounded off to the next higher figure according to all said cut off orders, said manipulative member being also settable to a second effective position not affecting said sensing members for rounding off said lowest required order according to the average value of said cut off orders.

13. In a printing calculating or like machine having a set of denominationally arranged actuators, and a register provided with a pair of intermeshing sets of pinions adapted to cooperate with said actuators, said register being adapted to be reversed either to an adding condition or to subtracting condition, a total taking device comprising in combination:

(a) means for causing said actuators to zeroize the corresponding orders of said register by engaging one of said sets of pinions, (b) a number of additional orders on said register located at right of said actuators, each additional order being provided with a pair of additional intermeshing pinions, said register being transversely movable during an accumulating operation for causing said additional pinions to cooperate with said actuators, (c) a number of toothed members located at right of said actuators and at the opposite side of said actuators with respect to said register, (d) an add-subtract control member adapted to be moved step by step through each one of three subsequent positions, said register being caused by said add-subtract control member when located in the central position of said three positions to assume a first one of said two conditions and when located in each extreme position of said three positions to assume the other one of said two conditions, (e) a ten transfer member associated with each pair of said set of pinions, the transfer member of the highest order being operable for signaling that a fugitive one occurs.

(f) a member operable under the control of said add-subtract control member and said highest order ten transfer member for indicating the sign of the total balance, (g) a total taking control member, (h) means operable by said total taking control member for predisposing said add-subtract control member according to the position of said total sign indicating member, (i) a pawl for advancing said add-subtract control member one step after said additional pinions are zeroized, (j) a further pair of pinions on said register at right of said additional pinions, (k) a further toothed member at right of said number of toothed members, (l) means for alternately engaging said register with said toothed members and with said actuators, (m) means for causing said number of toothed member to zeroize said additional pair of pinions before said actuators are engaged with said set of pinions to cut off the figures contained therein and for causing said further toothed member to zeroize said further pinions to a positive zero position or to a negative zero position according to said sign, said two positions being distanced one step, (n) means for causing said register to be reversed after engagement of said toothed member and before engagement of said actuators, (o) an element operable for introducing one unit in the lowest order pinions of said set, (p) a number of sensing members connected to said element for sensing individually said number of toothed members, (q) a cyclically operable member for engaging one of said sensing members upon said displacement of the corresponding toothed member for rounding off the lowest order required for the total, (r) and a further sensing member for sensing said further toothed member so as to be engaged by said cyclically operable member each time said further toothed member is displaced for zeroizing said further pinions, 14. A total taking device according to claim 13, comprising:

(s) a cam on each one of said number of toothed members for controlling the corresponding sensing members, (t) a manipulative member settable in a first effective position for replacing said cams of said number of sensing members when said cams are displaced not less than a predetermined amount, whereby said lowest required order is rounded off to the next higher figure according to all said cut off order, said manipulative member being also settable to a second effective position not affecting said number of sensing members for rounding off said lowest required order according to the average value of said cut off orders.

References Cited
UNITED STATES PATENTS

| | | | |
|---|---|---|---|
| 1,692,293 | 11/1928 | Davy | 235—144 |
| 2,044,756 | 6/1936 | Pearson | 235—144 |
| 2,617,594 | 11/1952 | Gang | 235—144 |
| 2,985,369 | 5/1961 | Lindberg | 235—144 |

RICHARD B. WILKINSON, *Primary Examiner.*

S. A. WAL, *Assistant Examiner.*